United States Patent
Kuramoto

(10) Patent No.: US 7,167,601 B2
(45) Date of Patent: Jan. 23, 2007

(54) IMAGE PROCESSING DEVICE, IMAGE PROCESSING METHOD, IMAGE PROCESSING PROGRAM, AND STORAGE MEDIUM STORING IMAGE PROCESSING PROGRAM

(75) Inventor: Hisakazu Kuramoto, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 781 days.

(21) Appl. No.: 10/337,424

(22) Filed: Jan. 7, 2003

(65) Prior Publication Data

US 2003/0133626 A1    Jul. 17, 2003

(30) Foreign Application Priority Data

Jan. 16, 2002   (JP) .............................. 2002-007353

(51) Int. Cl.
   G06K 9/40       (2006.01)
   G06K 9/32       (2006.01)
(52) U.S. Cl. .................... 382/298; 382/275; 382/264; 382/299; 382/300

(58) Field of Classification Search ................ 382/255, 382/260, 261, 264, 269, 298, 299, 300
See application file for complete search history.

(56) References Cited

U.S. PATENT DOCUMENTS

| 6,023,535 | A  | * | 2/2000 | Aoki ........................... 382/299 |
| 6,091,861 | A  | * | 7/2000 | Keyes et al. ................. 382/299 |
| 6,990,249 | B2 | * | 1/2006 | Nomura ...................... 382/254 |
| 2001/0033674 | A1 | * | 10/2001 | Chen et al. .................. 382/100 |
| 2006/0193535 | A1 | * | 8/2006 | Mishima et al. ............ 382/294 |

FOREIGN PATENT DOCUMENTS

JP          06-113120          4/1994

\* cited by examiner

*Primary Examiner*—Bhavesh M. Mehta
*Assistant Examiner*—Wes Tucker
(74) *Attorney, Agent, or Firm*—Nixon & Vanderhye, PC

(57) ABSTRACT

There are provided: a lattice noise estimating section (5) for estimating a lattice noise occurrence rate in an output image; and a pre-blurring process section (6) for performing a pre-blurring process with strength that has been determined in accordance with the lattice noise occurrence rate estimated by the lattice noise estimating section (5).

19 Claims, 9 Drawing Sheets

IMAGE PROCESSING DEVICE, IMAGE PROCESSING METHOD, IMAGE PROCESSING PROGRAM, AND STORAGE MEDIUM STORING IMAGE PROCESSING PROGRAM

FIELD OF THE INVENTION

The present invention relates to an image processing device, an image processing method, an image processing program, and a storage medium storing the image processing program, by which an image process is performed with respect to image data of an image recorded on a photo-film such as a film so as to be provided to a photo-printing device. The present invention relates particularly to an image processing device, an image processing method, an image processing program, and a storage medium storing the image processing program, by which a sharpening process for reducing a lattice noise of an output image is performed.

BACKGROUND OF THE INVENTION

Conventionally, as a photo-printing device for printing an image recorded on a film onto a printing paper, there have been proposed various kinds of an analog printer for directly exposing the printing paper and various kinds of a digital printer which causes a CCD (charge coupled device) to read the image recorded on the film so as to expose the printing paper in accordance with the obtained image data. Particularly, the digital printer is advantageous in that: it is possible to perform color correction and density correction etc., that cannot be realized by the analog printer, by using the digital printer in combination with an image processing device for performing the image process, such as the color correction and the density correction, with respect to the image data, and it is possible to obtain the image which satisfies needs of a customer easily and quickly. Thus, such a digital printer is widely used now.

Such a digital printer is used in combination with an image processing device for performing the image process, such as the color correction and the density correction, with respect to the image data, so that it is possible to perform color correction and density correction etc., that cannot be realized by the analog printer. Thus, the digital printer is advantageous in that: by using the digital printer in combination with the foregoing image processing device, it is possible to obtain the image which satisfies needs of a customer easily and quickly.

As to the image processing device, interpolating pixels are calculated in accordance with a linear interpolating (bi-linear) method or a three dimensional interpolating (bi-cubic) method so as to vary the number of pixels in a case where the digital image is scaled up and down.

In both cases of the linear interpolating method and the three dimensional interpolating method, data of pixels in a scaled-up image is calculated by performing interpolation in accordance with pixel data of an image which has not been scaled up.

Here, the linear interpolating method is detailed. That is, description is given on a case where: a pixel value of an original image is indicated by $P(i,j)$ (i,j is a coordinate value), and a pixel value $Q(x,y)$ at a time when the original image is scaled up (down) by r times is calculated. Note that, when $r>1$, the scaling-up process is performed, and when $0<r<1$, the scaling-down process is performed. At this time, $Q(x,y)$ is calculated in accordance with the following expression (1).

$$Q(x, y) = (1-t)\{(1-s)P(i, j) + sP(i+1, j)\} + \\ t\{(1-s)P(i, j+1) + sP(i+1, j+1)\} \quad (1)$$

Note that, in the foregoing expression (1), $i=[x/r]$, $j=[y/r]$ ([a] indicates the maximum integer not more than a), $s=x/r-i$, $t=y/r-j$.

FIG. 8 illustrates a relationship in the expression (1). As shown in FIG. 8, $Q(x,y)$ is a pixel value corresponding to a specific point in an internal area of a square surrounded by four points $P(i,j)$, $P(i+1,j)$, $P(i,j+1)$, and $P(i+1,j+1)$ of the original image. The specific point divides $P(i,j)$ and $P(i+1,j)$ so that s:1−s in terms of an x coordinate, and divides $P(i,j)$ and $P(i,j+1)$ so that t:1−t in terms of a y coordinate.

Here, $(1-s)P(i,j)+sP(i+1,j)$ in the first term of the right side of the expression (1) indicates an A point of FIG. 8, that is, a pixel value of a point dividing $P(i,j)$ and $P(i+1,j)$ so that s:1−s. Further, $(1-s)P(i,j+1)+sP(i+1,j+1)$ in the second term of the right side of the expression (1) indicates a B point of FIG. 8, that is, a pixel value of a point dividing $P(i,j+1)$ and $P(i+1, j+1)$ so that s:1−s. Further, $Q(x,y)$ is a pixel value of a point dividing the A point and the B point so that t:1−t. Thus, the expression (1) is set.

In the linear interpolating method, in a case where a position of a pixel corresponding to $Q(x,y)$ is identical to a position of the point $P(i,j)$ of the original image, that is, in a case where s=t=0, the pixel value of $P(i,j)$ is used as the pixel value of $Q(x,y)$. While, in a case where a pixel corresponding to $Q(x,y)$ is positioned at a central point of the internal area of the square surrounded by the four points $P(i,j)$, $P(i+1,j)$, $P(i,j+1)$, $P(i+1,j+1)$ of the original image, that is, in a case where s=t=0.5, an average value of the pixel values of these four points is the pixel value of $Q(x,y)$.

As the pixel corresponding to $Q(x,y)$ is positioned closer to any one of these four points $P(i,j)$, $P(i+1,j)$, $P(i,j+1)$, $P(i+1,j+1)$ of the original image in this manner, the pixel value of $Q(x,y)$ tends to be influenced by the closest point. In this case, a value close to the pixel value is used as a pixel value of the scaled-up (down) image, so that the sharpness hardly varies.

While, as the pixel corresponding to $Q(x,y)$ is positioned closer to the central point of the internal area of the square surrounded by the four points of the original image, the pixel value of $Q(x,y)$ is a value influenced by pixel values of more pixels of the original image. In this case, values of some pixels are added to each other so as to calculate a pixel value of the scaled-up (down) image. Such a process corresponds to a process for smoothing the image, so that an image area calculated in this manner is an image whose sharpness is a little deteriorated.

That is, as $Q(x,y)$ is positioned closer to the central point of the internal area of the square surrounded by the four points of the original image, noises contained in the original image are weakened due to the smoothing so as to be outputted. While, as the pixel corresponding to $Q(x,y)$ is positioned closer to any one of the four points $P(i,j)$, $P(i+1,j)$, $P(i,j+1)$, $P(i+1,j+1)$ of the original image, the noises contained in the original image are outputted as they are.

Thus, as shown in FIG. 9, there occurs unevenness in the noise strength of the image data after scaling up (down). That is, in FIG. 9, a coordination position of each pixel is indicated as a horizontal axis, and the noise strength is indicated as a vertical axis.

Note that, FIG. 9 illustrates a case where the original image is scaled up by 1.25 times. That is, four sections divided by five pixels a1 to a5 (indicated by "○" in FIG. 9) adjacent to each other in the original image are scaled up as five sections divided by six pixels b1 to b6 (indicated by "●" in FIG. 9) adjacent to each other in the scaled up image.

The pixels b1 and b6 of the scaled-up image are identical to the pixel a1 and a5 of the original image in terms of the coordination position, so that the noise strength of the scaled-up image is the same as in the original image. While, the pixels b2 to b5 of the scaled-up image are positioned closer to central points between the respective pixels, so that the noise strength is reduced.

Further, in FIG. 9, the sections having five pixels of the original image data and six pixels of the scaled-up image are extracted so as to be illustrated. That is, as to pixels of the entire image, a portion, in which the noise strength is high in the scaled-up image, and a portion, in which the noise strength is low in the scaled-up image, are brought about periodically.

In the image data of the scaled-up (down) image, unevenness in the noise strength occurs periodically, so that there occur a portion having many noises and a portion having less noises. Further, density seems to be different between the portion having many noises and the portion having less noises, so that there occurs density unevenness in the scaled-up (down) image.

Thus, in the scaled-up (down) image, there occurs such a problem that: the density unevenness brought about in the foregoing manner looks like striped patterns in a lattice manner (hereinbelow referred to as lattice noise). For example, in a case where a scaling down process by 97% is performed, the striped patterns are brought about at each pitch of about 5 mm.

Further, in a case where an analog image on a negative film is read as a digital image so as to perform the scaling-up (down) process with respect to the digital image for example, the following case is brought about.

That is, when an image on the negative film is in a state of underexposure (density of the entire image is slightly low), a process for strengthening contrast is performed so as to prevent the scaled-up (down) image from being blurred. The process for strengthening contrast causes the lattice noise brought about by the scaling-up (down) process to be conspicuous, so that the image quality is deteriorated.

While, in a case where the image on the film is in a state of overexposure (density of the entire image is slightly high), light that a CCD functioning as an imaging device reads from the film is little. Thus, an output of the CCD is comparatively low, and many electric noises are contained in the information, so that the lattice noise having been subjected to the scaling-up (down) process is conspicuous in the image information, thereby bringing about such a problem that the image quality is deteriorated.

In the case where the density of the entire input image is slightly high or low in this manner, the lattice noise brought about by the scaling-up (down) process is conspicuous, so that there occurs such a problem that the image quality is deteriorated.

SUMMARY OF THE INVENTION

The present invention was conceived from the view point of the foregoing problems, and its object is to provide an image processing device, an image processing method, an image processing program, and a storage medium storing the image processing program, by which it is possible to output a high-quality image in which a lattice noise is reduced.

In order to achieve the foregoing object, the image processing device of the present invention, which performs a scaling-up/down process with respect to an input image so as to output a digital image, includes: lattice noise occurrence rate estimating means for estimating a lattice noise occurrence rate in an output image; and pre-blurring process means for performing a pre-blurring process with strength that has been determined in accordance with the lattice noise occurrence rate estimated by the lattice noise occurrence rate estimating means.

Further, in order to achieve the foregoing object, the image processing method of the present invention for performing a scaling-up/down process with respect to an input image so as to output a digital image includes the steps of: estimating a lattice noise occurrence rate in an output image; and performing a blurring process with strength that has been determined in accordance with the lattice noise occurrence rate.

That is, the image processing device and the image processing method of the present invention are to perform the scaling-up (down) process with respect to the input image so as to output the image. Further, the noise strength unevenness occurs in the scaled-up (down) image, and there occur a portion having more noises and a portion having less noises. This difference in the noise is regarded as difference in the density, so that striped patterns in a lattice manner (lattice noise) sometimes occur in the output image.

Then, the image processing device of the present invention, particularly, includes: lattice noise occurrence rate estimating means for estimating a lattice noise occurrence rate in an output image; and pre-blurring process means for performing a pre-blurring process with strength that has been determined in accordance with the lattice noise occurrence rate estimated by the lattice noise occurrence rate estimating means.

Further, the image processing method of the present invention, particularly, includes the steps of: estimating a lattice noise occurrence rate in an output image; and performing a blurring process with strength that has been determined in accordance with the lattice noise occurrence rate.

That is, in a case where the lattice noise occurrence rate estimating section estimates the lattice noise occurrence rate to be high, strength of the blurring process performed by the pre-blurring process section is set to be high, so that it is possible to blur noises contained in the input image.

Thus, in the output image that has been subjected to the scaling-up (down) process, it is possible to reduce the difference in the density between the portion having many noises and the portion having less noises. Therefore, it is possible to output a high-quality image in which the lattice noise is reduced.

For a fuller understanding of the nature and advantages of the invention, reference should be made to the ensuing detailed description taken in conjunction with the accompanying drawings.

DESCRIPTION OF THE EMBODIMENTS

The following description will discuss one embodiment of the present invention referring to FIG. 1 through FIG. 7.

Figure 1:
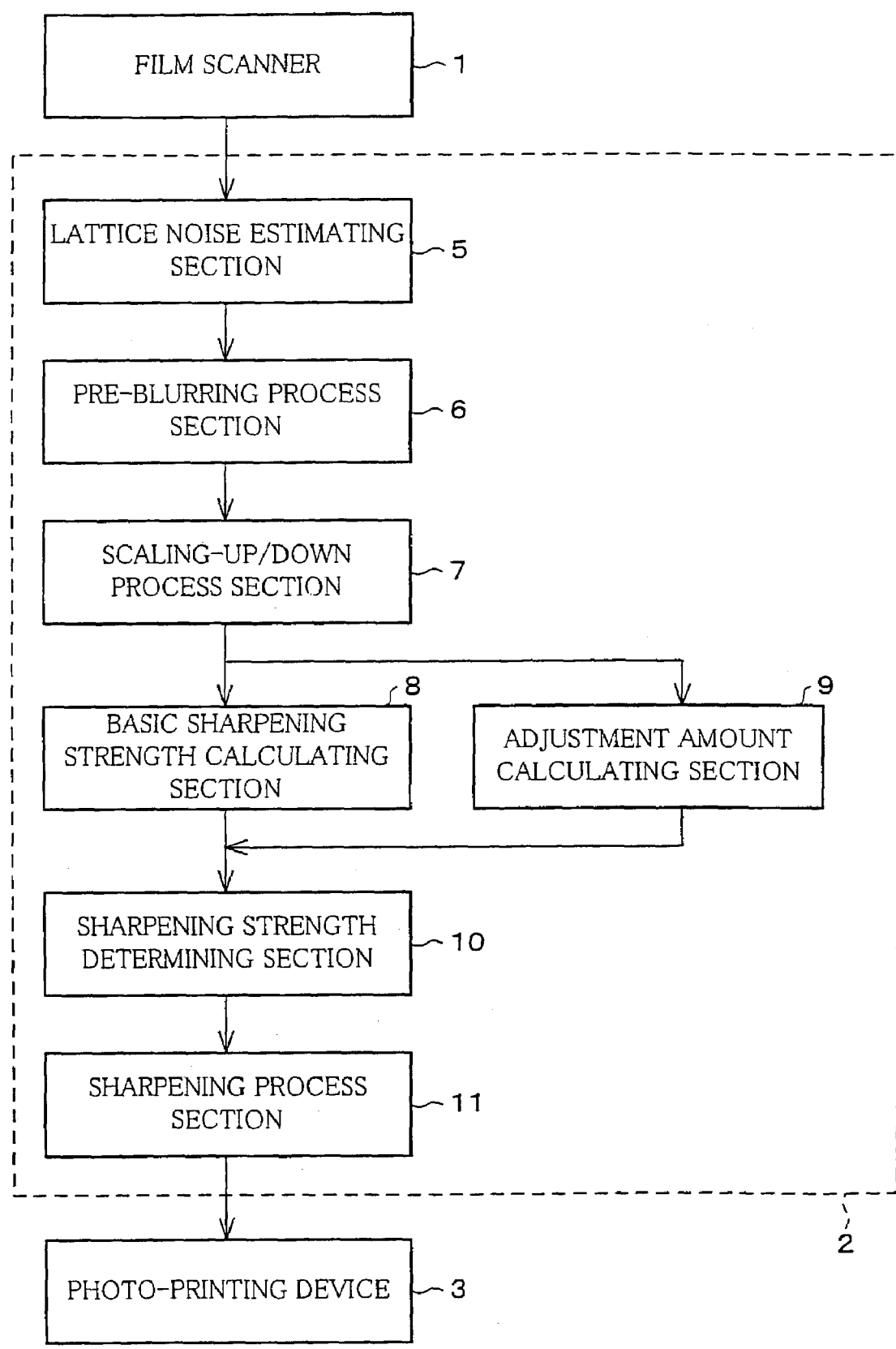
FIG. 1 is a block diagram showing an arrangement of an image processing device according to one embodiment of the present invention and a digital exposing system containing the image processing device.

As shown in FIG. 1, a digital exposing system according to the present embodiment includes a film scanner 1, an image processing device 2, and a photo-printing device 3.

By receiving light, obtained via a negative film which functions as a photo-film, by means of a CCD (Charge Coupled Device) and the like, the film scanner 1 reads an image recorded on the negative film, and outputs image data of R, G, and B, corresponding to the image, to the image processing device 2.

The photo-printing device 3 exposes a developing paper, which functions as a sensitive material, in accordance with the image data from the image processing device 2, so that an image is printed on the developing paper. As long as light irradiated on the developing paper can be modulated according to digital image data, any device may be used as an exposing section which exposes the developing paper. For example, the exposing section includes a PLZT exposing head, a DMD (digital micro mirror device), an LCD (liquid crystal device), an LED panel, a laser, a FOCRT (Fiber Optic Cathode Ray Tube), a CRT, and the like. Note that, the photo-printing device 3 may be arranged so as to be able to perform (a) scanning with respect to the negative film and (b) exposure with respect to the developing paper. In this case, the digital exposing system is constituted of the image processing device 2 and the photo-printing device 3, so that it is possible to simplify the system.

The image processing device 2 includes: a lattice noise estimating section (lattice noise occurrence rate estimating means) 5; a pre-blurring section (pre-blurring means) 6; a scaling-up/down process section 7; a basic sharpening strength calculating section 8; an adjustment amount calculating section 9; a sharpening strength determining section 10; and a sharpening process section (sharpening process means) 11. Note that, FIG. 1 shows an arrangement of the image processing device 2 so as to illustrate mainly the pre-blurring process, the scaling-up/down process, and the sharpening process. That is, as to color correction, density correction, gradation modulation, and the like, typically performed by the image processing device 2, description thereof is omitted in FIG. 1.

The lattice noise estimating section 5 estimates a lattice noises occurrence rate in an output image. How the lattice noise estimating section 5 estimates the lattice noise occurrence rate will be described later.

The pre-blurring section 6 determines the pre-blurring strength, so as to blur noises in an input image in advance, in accordance with the lattice noise occurrence rate that has been estimated by the lattice noise estimating section 5, and performs the pre-blurring in accordance with the pre-blurring strength that has been determined. How the pre-blurring section 6 performs the pre-blurring process will be described later.

The scaling-up/down process section 7, as described in BACKGROUND OF THE INVENTION, changes the number of pixels by calculating interpolated pixels in accordance with a linear interpolating method, a three dimensional interpolating method, and the like, so as to perform a scaling-up/down process with respect to an original image.

The basic sharpening strength calculating section 8 calculates the sharpening strength in a case where reduction of the lattice noise in the output image is not taken into consideration (hereinbelow referred to as basic sharpening strength). How the basic sharpening strength calculating section 8 calculates the basic sharpening strength will be detailed later.

The adjustment amount calculating section 9 determines an adjustment amount of the basic sharpening strength, so as to perform a sharpening process for reducing the lattice noise, in accordance with the pre-blurring strength that has been determined by the pre-blurring section 6.

The sharpening strength determining section 10 determines the sharpening strength, at which the lattice noise is reduced, in accordance with (a) the basic sharpening strength that has been determined by the basic sharpening strength calculating section 8 and (b) the adjustment amount that has been determined by the adjustment amount calculating section 9. How the adjustment amount calculating section 9 determines the adjustment amount, and how the sharpening strength determining section 10 determines the basic sharpening strength having been subjected to the adjustment, will be detailed later.

The sharpening process section 11 performs the sharpening process in accordance with the basic sharpening strength that has been adjusted by the sharpening strength determining section 10. By performing the sharpening process, the sharpness of the original image that has been temporarily blurred by the pre-blurring process is restored. How the sharpening process section 11 performs the sharpening process will be described later.

According to the arrangement, the image processing device 2 of the present embodiment causes the pre-blurring section 6 to blur the noises contained in the input image, so as to output the image to the photo-printing device 3. Further, the image processing device 2 of the present embodiment causes the sharpening process section 11 to perform the sharpening process using the sharpening strength determined by the sharpening strength determining section 10, so that the sharpness of the original image that has been temporarily blurred by the pre-blurring process is restored. Thus, in an image outputted from the photo-printing device 3, the lattice noise is reduced, and an image having preferable sharpness is produced.

Note that, it is also possible that a block, including the basic sharpening strength calculating section 8, the adjustment amount calculating section 9, the sharpening strength determining section 10, and the sharpening process section 11, is provided between the pre-blurring section 6 and the scaling-up/down process section 7.

Next, detail description will be given on (1) how the lattice noise estimating section 5 estimates the lattice noise occurrence rate, (2) how the pre-blurring section 6 performs the pre-blurring process, and (3) how the basic sharpening strength calculating section 8 calculates the basic sharpening strength, (4) how the adjustment amount calculating section 9 determines the adjustment amount, and how the sharpening strength determining section 10 determines the basic sharpening strength having been subjected to the adjustment, and (5) how the sharpening process section 11 performs the sharpening process, in this order.

(1) A Procedure in which the Lattice Noise Estimating Section 5 Estimates the Lattice Noise Occurrence Rate.

The lattice noise estimating section 5 estimates the lattice noise occurrence rate in accordance with an expansion rate and image density. The following description will discuss ①a case where the lattice noise occurrence rate is estimated in accordance with the expansion rate, and ②a case where the lattice noise occurrence rate is estimated in accordance with the image density, in this order.

①A case where the lattice noise occurrence rate is estimated in accordance with the expansion rate.

Figure 2:
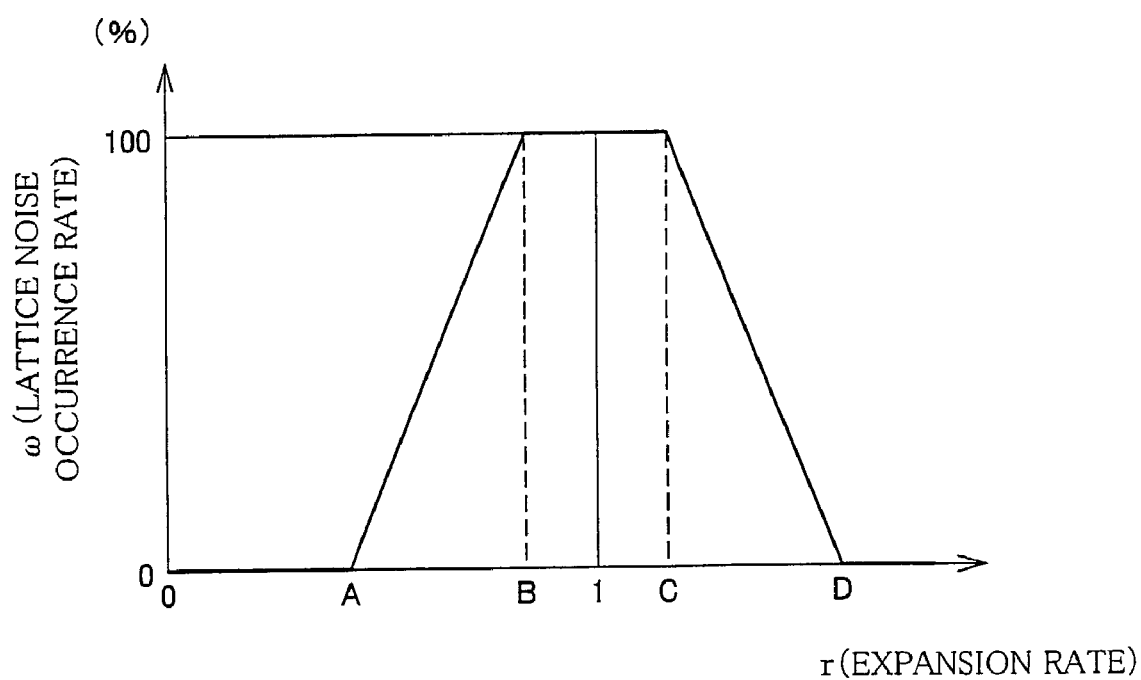
FIG. 2 is a pattern diagram showing an estimation table that a lattice noise estimating section of the image processing device of FIG. 1 uses to estimate a lattice noise occurrence rate in accordance with an expansion rate.

The lattice noise estimating section 5 estimates a lattice noise occurrence rate ω from an expansion rate r, in accordance with an estimation table shown in FIG. 2. Note that, in a case where the expansion rate is not more than 1, this indicates a case where a scaling-down process is performed.

As shown in FIG. 2, in the estimation table, the expansion rate r is set as a horizontal axis, and the lattice noise occurrence rate ω is set as a vertical axis. Further, in the horizontal axis of the estimation table, four threshold values A, B, C, and D (A<B<C<D) are set.

Further, in the estimation table, when B<r<C, the lattice noise occurrence rate ω is set to 100(%). Further, in a case where the expansion rate r varies from A to B, and in a case where the expansion rate r varies from C to D, the setting is such that the lattice noise occurrence rate ω increases (decreases) from 0(%) to 100(%). Moreover, in a case where the expansion rate r is not more than A, and in a case where the expansion rate r is not less than D, the lattice noise occurrence rate ω is set to 0(%).

Note that, in a case where the expansion rate r is 1, the lattice noise occurrence rate ω is set to 0. Thus, in the estimation table shown in FIG. 2, a vertical line, which passes through a point of r=1 and crosses the horizontal line at a right angle, is set.

Reasons for which the estimation table can be set in the foregoing manner are described as follows referring to FIG. 3.

Figure 3:
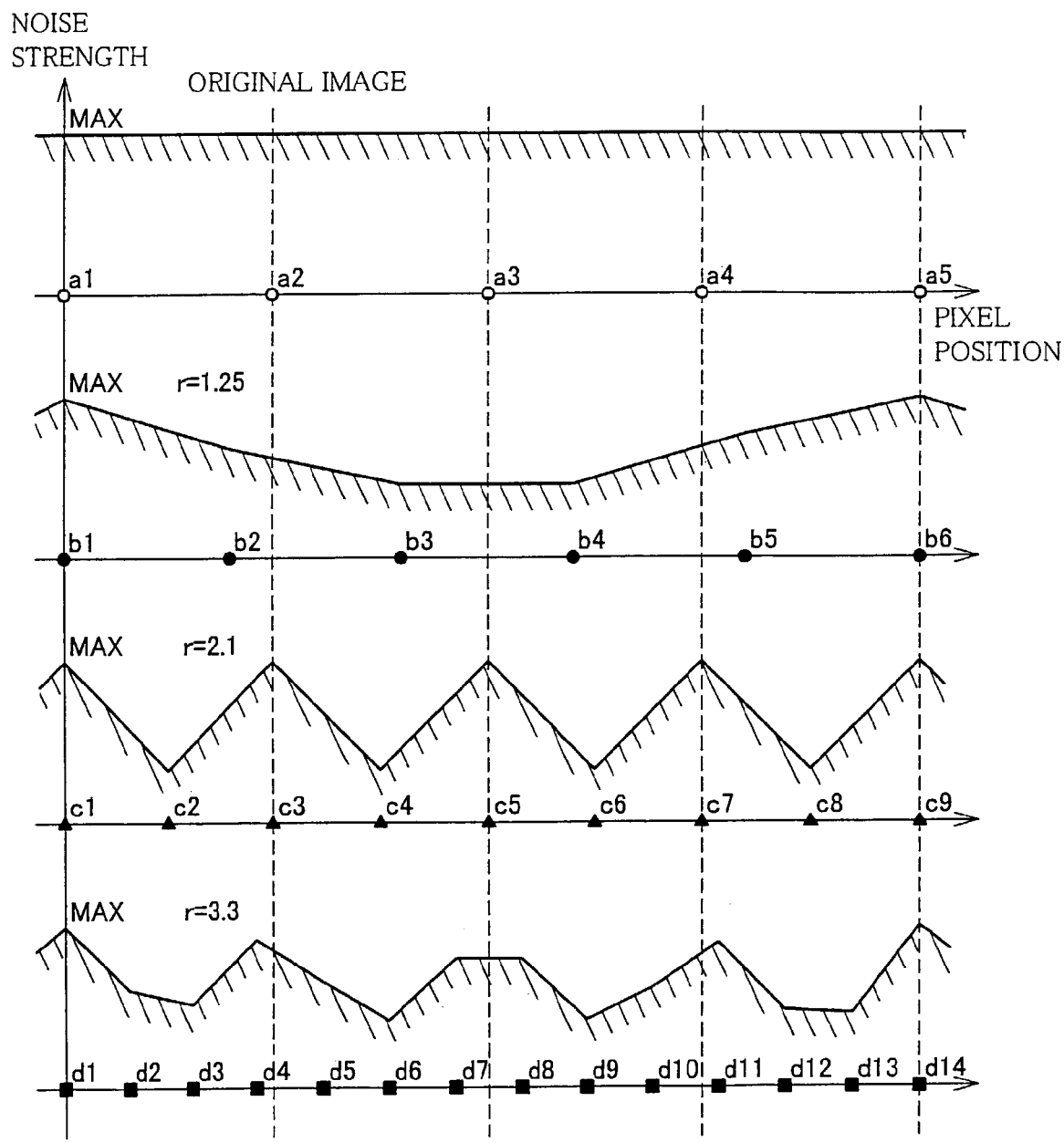
FIG. 3 is a pattern diagram showing a relationship between a pixel position and noise strength in respective cases where an original image is scaled up by 1.25 times, 2.1 times, and 3.3 times.

FIG. 3 shows a relationship between a pixel position and the noise strength in cases where the original image is expanded by 1.25 times, 2.1 times, and 3.3 times. In FIG. 3, pixels a1 to a5 of the original image are indicated with "○", and pixels b1 to b6 in a case where the expansion rate is 1.25 are indicated with "●", and pixels c1 to c9 in a case where the expansion rate is 2.1 are indicated with "▲", and pixels d1 to d14 in a case where the expansion rate is 3.3 are indicated with "■".

As shown in FIG. 3, when the expansion rate is 1.25, the pixel b3 having been subjected to the scaling-up process is positioned close to a center between the pixel a2 and the pixel a3 of the original image. Further, the pixel b4 having been subjected to the scaling-up process is positioned close to a center between the pixel a3 and the pixel a4. Thus, in the pixels b3 and b4, the noise strength drops.

Further, in a case where the expansion rate comes close to 1, it is considered that pixels in which the noise strength drops in the foregoing manner are sequentially positioned. That is, in the pixels having been subjected to the scaling-up process, there occurs an area in which the noise strength drops, and the area is so long that the sequence can be recognized by unaided eyes, so that the lattice noise tends to occur.

While, in the case where the expansion rate is 2.1, the pixel c2 having been subjected to the scaling-up process is positioned close to a center between the pixel a1 and the pixel a2 for example, so that the noise strength drops. However, the pixels c1 and c3 adjacent to the pixel c2 are respectively positioned close to the pixels a1 and a2 of the original image, so that the noise strength is high.

Further, in the case where the expansion rate is 3.3, the pixel d6 having been subjected to the scaling-up process is positioned close to the center between the pixel a2 and the pixel a3 for example, so that the noise strength drops. However, the pixels d5 and d7 adjacent to the pixel d6 are respectively positioned close to the pixels a2 and a3 of the original image, so that the noise strength is high.

That is, in a case where the expansion rate becomes higher than 1, it is not considered that many pixels in which the noise strength drops are sequentially positioned. That is, in pixels having been subjected to the scaling-up process, there are pixels in which the noise strength drops, but the noise strength is high in pixels adjacent to those pixels. That is, an area in which the noise strength drops is so short that the sequence cannot be recognized by unaided eyes, so that the lattice noise hardly occurs.

According to the foregoing reasons, it is possible to estimate the lattice noise occurrence rate from the expansion rate by using the estimation table shown in FIG. 2.

②A case where the lattice noise occurrence rate is estimated in accordance with the image density.

Figure 4:
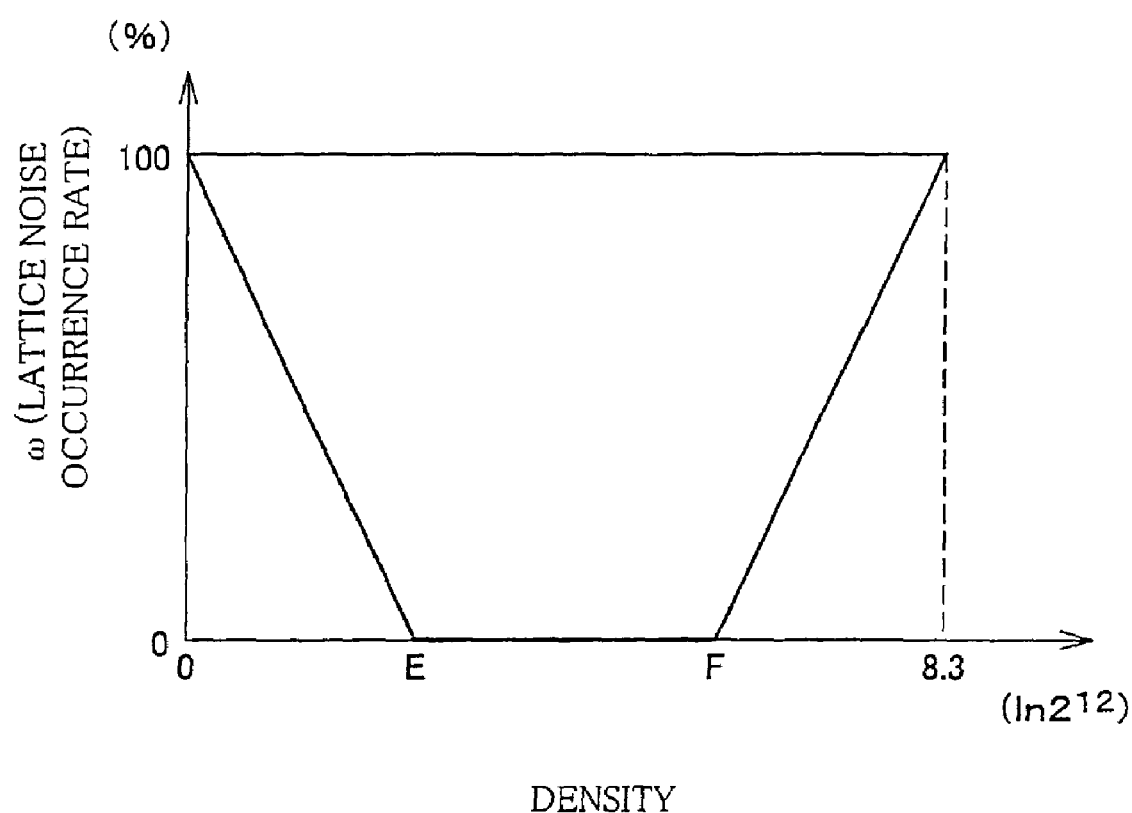
FIG. 4 is a pattern diagram showing an estimation table that the lattice noise estimating section of the image processing device of FIG. 1 uses to estimate the lattice noise occurrence rate in accordance with density of an input image.

The lattice noise estimating section 5 estimates the lattice noise occurrence rate ω from a total average density, by using an estimation table shown in FIG. 4 for example.

As shown in FIG. 4, in the foregoing table, a logarithmic value of the total average density of an image on a film is set as a horizontal axis, and the lattice noise occurrence rate is set as a vertical axis. Further, two threshold values E and F (E<F) are set in the horizontal axis of the estimation table.

Description is given on a case where the film scanner 1 reads an image on the negative film as a digital image of 12 bits for example.

In this case, the minimum value of the density which can be obtained in an input image is 0, and the maximum value of the density which can be obtained in the input image is $\ln 2^{12}$=8.3. Further, as the logarithmic value of the total average density is smaller, the image on the negative film is darker, so that it can be said that the image tends to be in a state of underexposure. While, as the logarithmic value of the total average density is larger, the image on the negative film is brighter, so that it can be said that the image tends to be in a state of overexposure.

Then, in the estimation table, it is assumed that when the logarithmic value of the total average density is 0, it is assumed that the lattice noise occurrence rate is 100%, and when the logarithmic value of the total average density is the threshold value E, the lattice noise occurrence rate is 0%. Further, it is assumed that: a straight line, which connects two points (0, 100) and (E, 0) to each other, indicates the lattice noise occurrence rate in a case where the logarithmic value of the total average density ranges from 0 to the threshold value a.

While, it is assumed that when the logarithmic value of the total average density is 8.3, the lattice noise occurrence rate is 100%, and when the logarithmic value of the total average density is the threshold value F, the lattice noise occurrence rate is 0%. Further, a straight line, which connects two points (b, 0) and (8.3, 100) to each other, indicates the lattice noise occurrence rate in a case where the logarithmic value of the total average density ranges from b to the threshold value 8.3. Note that, the strait line may be a curved line.

Note that, in a case where the logarithmic value of the total average density ranges from E to F, it is assumed that: the lattice noise does not occur, so that the lattice noise occurrence rate is 0.

By using the estimation table made in the foregoing manner, the lattice noise estimating section 5 calculates the lattice noise occurrence rate in accordance with the total average density.

Note that, a reason for which the estimation table is set in this manner is as follows: the lattice noise is sometimes visible due to the process for strengthening contrast in the case of underexposure, as described in

BACKGROUND OF THE INVENTION.

While, another reason is as follows: the lattice noise is sometimes visible in the output image since an output of the CCD is smaller in the case of overexposure.

Further, a reason for which the lattice noise occurrence rate is estimated in accordance with the total average density as described above is as follows: a method based on the total average density is most appropriate in grasping how an image is exposed. Thus, the method is not limited to the case where the lattice noise occurrence rate is estimated in accordance with the total average density, and the lattice noise occurrence rate may be estimated in accordance with density of a specific portion of the image.

In this manner, it is possible to estimate the lattice noise occurrence rate in accordance with the image density.

Note that, the lattice noise estimating section 5 can predict that either the foregoing method ① or ② causes the lattice noise not to occur. That is, the lattice noise occurs in a case where the expansion rate r is in a relationship of A<r<D, and the total average density is not more than E and not less than F. Thus, in order to predict that the lattice noise will not occur, it is judged that the expansion rate or the total average density is not in the foregoing relationship.

(2) Procedure in which the Pre-Blurring Section 6 Performs the Pre-Blurring.

The pre-blurring section 6 calculates the pre-blurring strength S in accordance with the following Expression ①.

$$S = S_{max} \times \omega \quad \text{Expression ①}$$

Note that, $S_{max}$ is the maximum value of the pre-blurring strength that can be obtained in the pre-blurring process, and can be set as an arbitrary value such as 128 or 64 in advance. Further, ω is the lattice noise occurrence rate estimated by the lattice noise estimating section 5.

Figure 5:
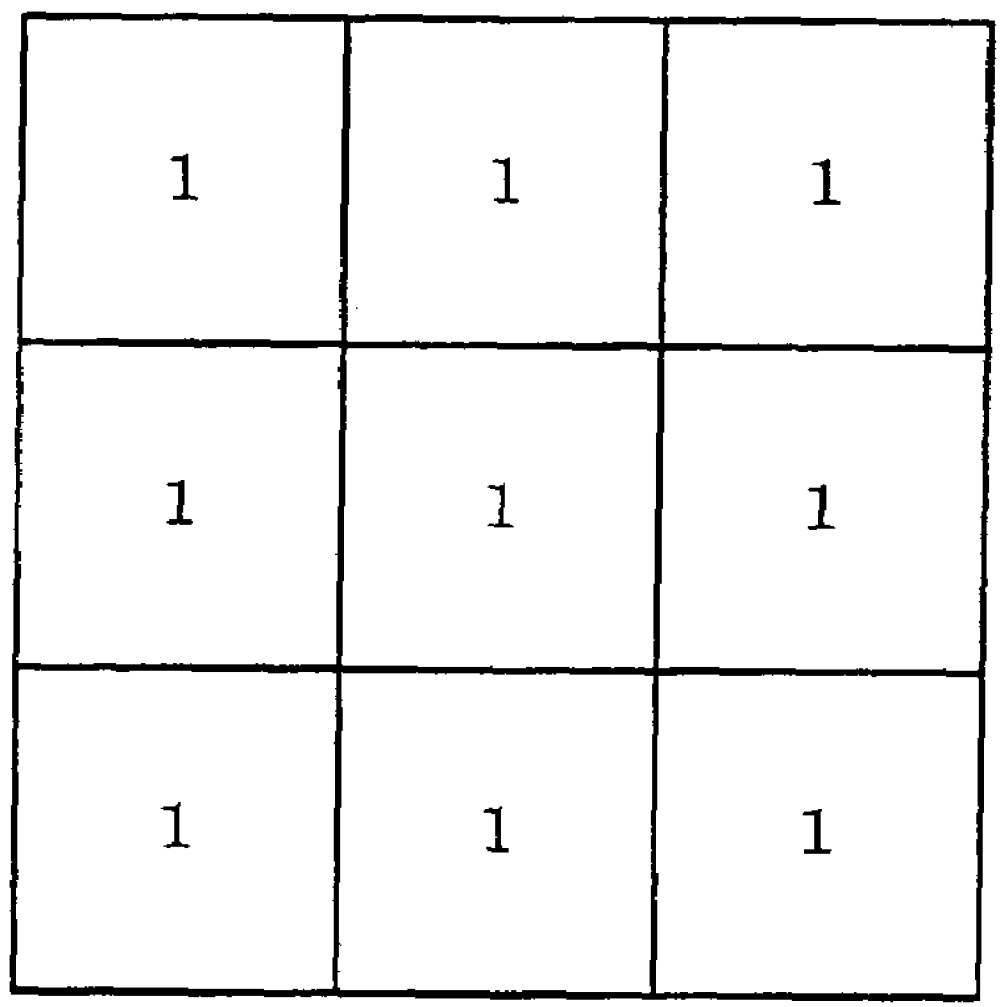
FIG. 5 is a pattern diagram showing an example of a moving average filter used when a pre-blurring section of the image processing device of FIG. 1 performs a pre-blurring process.

Next, filtering is performed with respect to input image data by using a moving average filter of 3×3 as shown in FIG. 5, so as to blur the whole image. Note that, the filtering is generally such that: a process for converting image data of a target pixel by using a desired filter is performed with respect to all the pixels except for pixels of end portions of the image while shifting the target pixels one by one. Further, in the pre-blurring process, a median filter, a Gaussian filter, and the like may be used so as to perform the filtering.

Next, in accordance with the following Expression ②, data d' of a target pixel having been subjected to the pre-blurring process is calculated from original data d of a target pixel that has not been subjected to the pre-blurring process.

$$d' = d + (x/\text{sum} - d) \times (S/S_{max}) \quad \text{Expression ②}$$
$$= d + (x/\text{sum} - d) \times \omega$$

Note that, in the Expression ②, S and $S_{max}$ are defined as in the foregoing Expression ①. Further, x is a total value of calculating results obtained upon filtering the respective pixels in the filter used to perform the pre-blurring process. The sum indicates the number of pixels of the filter used to perform the pre-blurring process.

According to the Expression ②, when the lattice noise occurrence rate ω is high, the pre-blurring strength is large. That is, when it is predicted that image quality is likely to be deteriorated due to the lattice noise in the output image, the pre-blurring process is performed with higher pre-blurring strength, so that it is possible to blur the noise in the input image more strongly.

In the foregoing manner, the data d' of the target pixel is calculated in accordance with the Expressions ① and ②, the pre-blurring section 6 performs the pre-blurring process.

(3) Procedure in which the Basic Sharpening Strength Calculating Section 8 Calculates the Basic Sharpening Strength.

Figure 6:
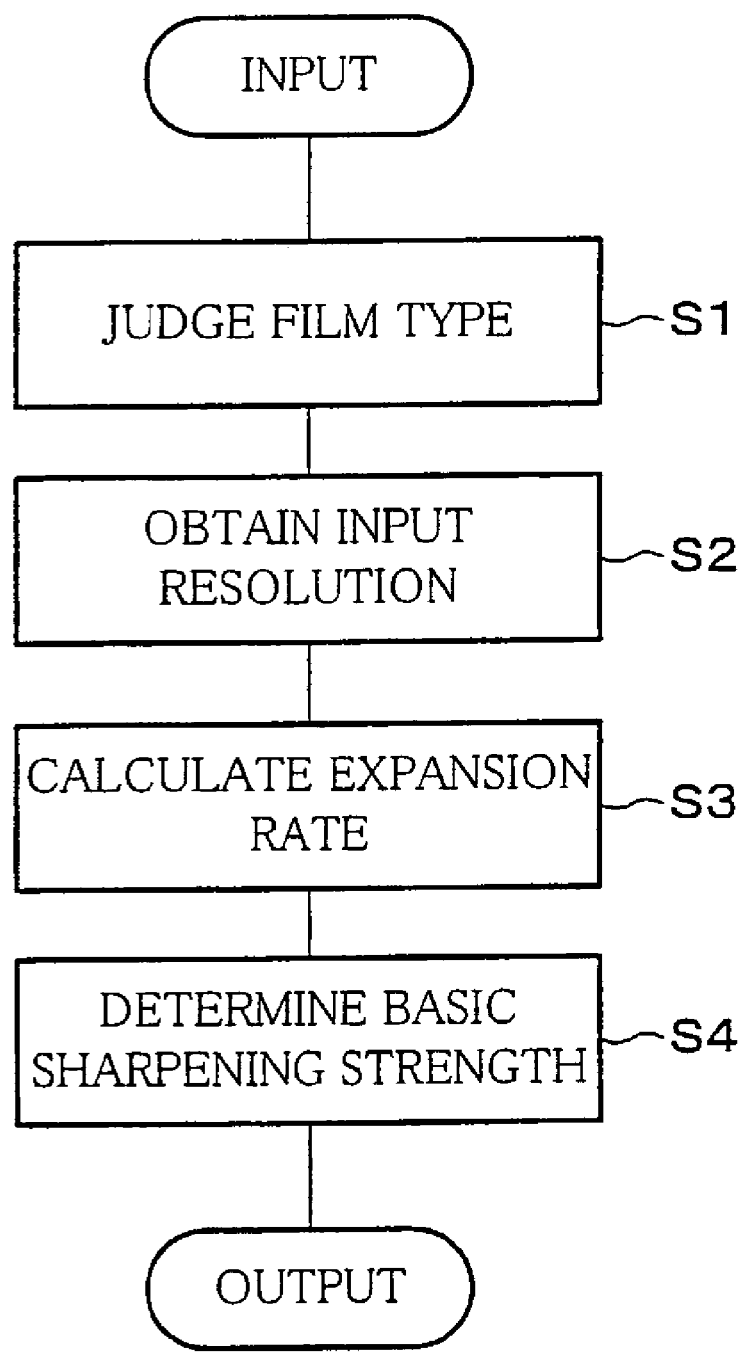
FIG. 6 is a flow chart showing a procedure in which a basic sharpening strength calculating section of the image processing device of FIG. 1 calculates a basic sharpening strength.

As shown in FIG. 6, in the procedure in which the basic sharpening strength calculating section 8 calculates the basic sharpening strength, at first in S1, judgment is performed with respect to a type of a film from which an image is read by the film scanner 1.

Concretely, whether the film is a negative film or a positive film is judged, and a size of the film is judged. Examples of the size of the film include a 110 film, a 120 film, a 135 film, and the like in terms of a JIS standard.

Next, in S2, resolution of the film scanner 1 is obtained. Note that, the resolution is determined depending on a scaling factor of a zoom lens in the film scanner 1. For example, when the scaling factor of the zoom lens varies from 0.88 to 2.0, it is possible to vary the resolution from 1200×1800 DPI (Dot Per Inch) to 3000×2000 DPI. That is, the setting is such that: as the scaling factor of the zoom lens is higher, the resolution is higher.

Next, in S3, an expansion rate is calculated. The expansion rate is determined depending on an input pixel number and an output pixel number of the CCD in the film scanner 1.

In accordance with the film type, the input resolution, and the expansion rate obtained in S1 to S3 in this manner, the basic sharpening strength is determined in S4.

That is, in a case where the film type is judged as a negative film in S1, the basic sharpening strength is set to be low. While, in a case where the film type is judged as a positive film in S1, the basic sharpening strength is set to be high.

Further, when the resolution obtained in S2 is higher, it is necessary to heighten the sharpness in the output image, so that the basic sharpening strength is set higher.

While, as the expansion rate calculated in S3 is higher, the basic sharpening strength is set to be larger.

Note that, although the basic sharpening strength is determined in S4 after performing the steps S1, S2, and S3 of the foregoing description, the order of the steps S1 to S3 is not necessarily limited. That is, as to the steps S1 to S3, the process may be started from any step, or steps S1 to S3 may be performed simultaneously.

(4) Procedure in which the Adjustment Amount Calculating Section 9 Determines the Adjustment Amount, and a Procedure in which the Sharpening Strength Determining Section 10 Determines the Basic Sharpening Strength having been Subjected to the Adjustment.

Figure 7:
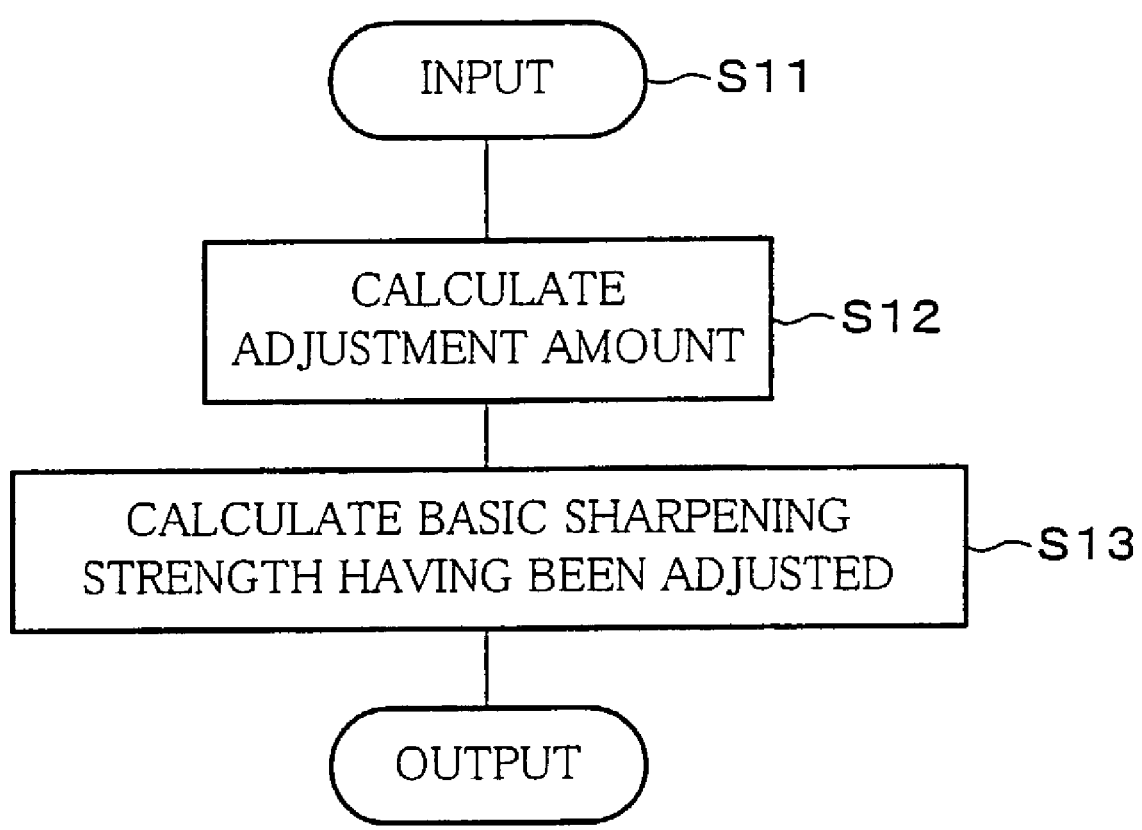
FIG. 7 is a flow chart showing a procedure in which an adjustment amount calculating section of the image processing device of FIG. 1 determines an adjustment amount, and showing a procedure in which a sharpening strength determining section determines basic sharpening strength having been adjusted.
Figure 8:
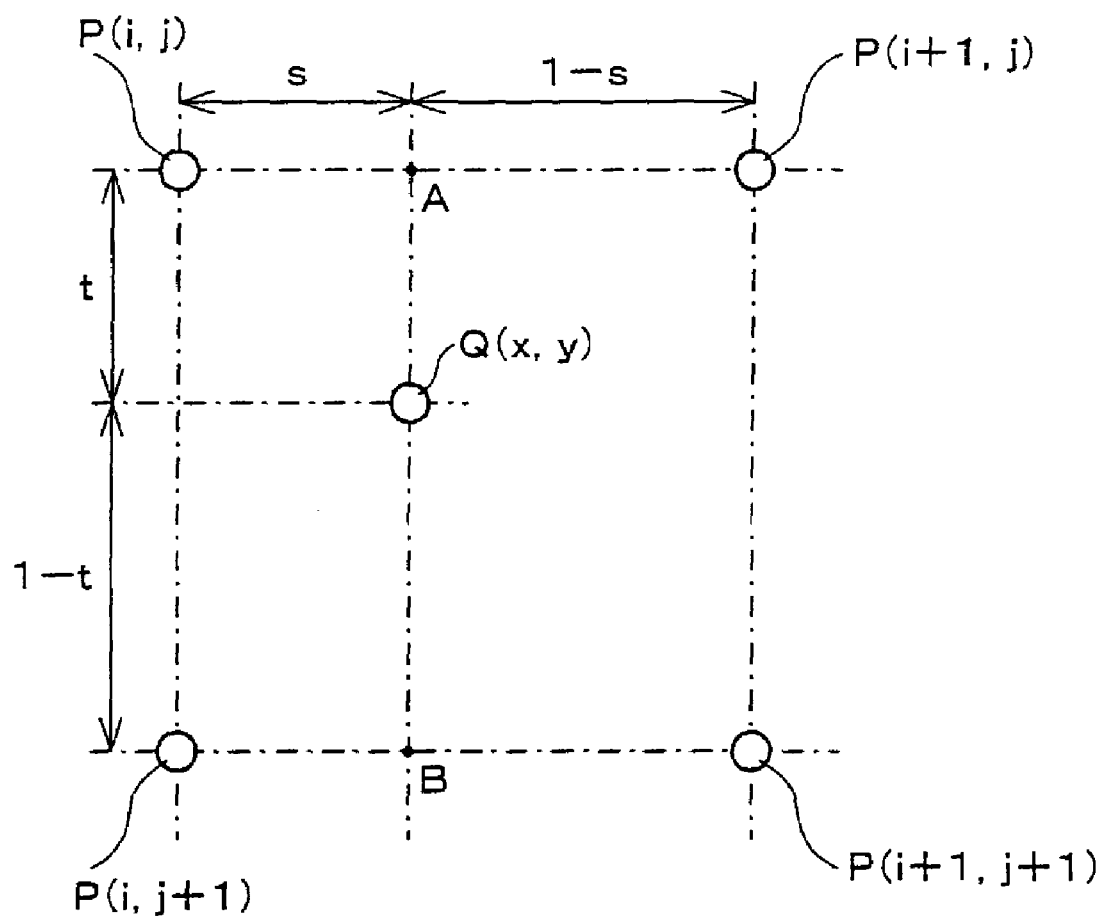
FIG. 8 is a pattern diagram showing a positioning relationship between a pixel interpolated in accordance with a linear interpolating method and an original image pixel, and showing a parameter used for calculation.
Figure 9:
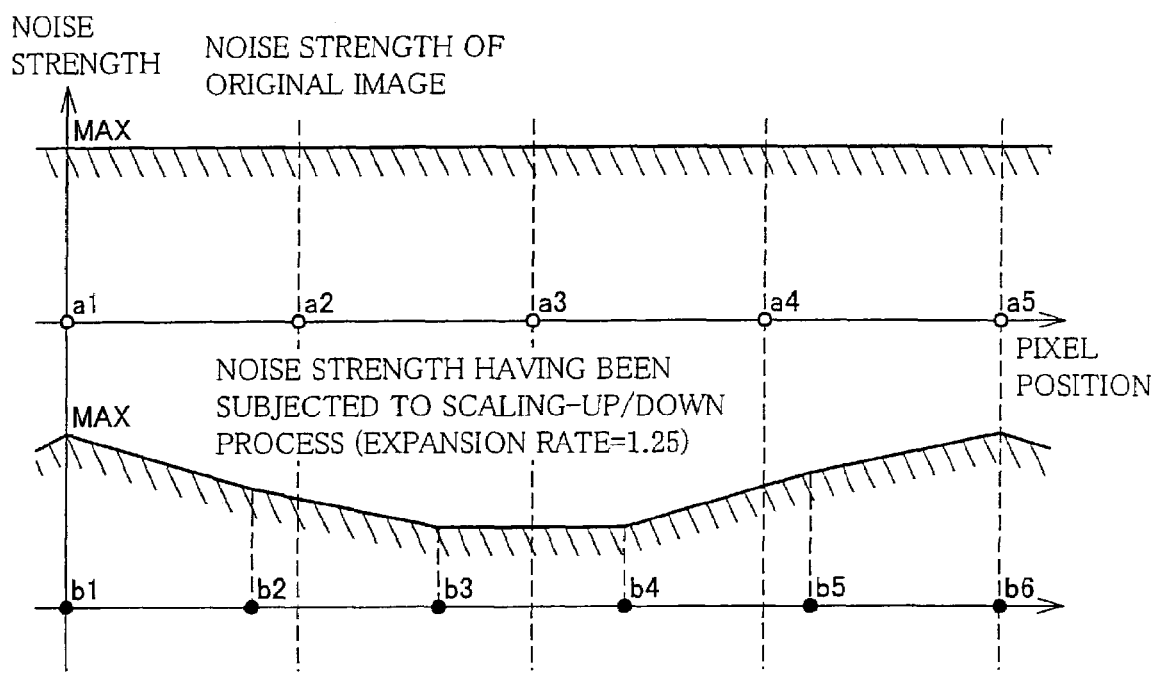
FIG. 9 is a pattern diagram showing a relationship between a pixel position and the noise strength in a case where the original image is scaled up by 1.25 times.

As shown in FIG. 7, at first in S11, the adjustment amount calculating section 9 obtains (a) the basic sharpening strength α calculated by the sharpening strength calculating section 8 and (b) the lattice noise occurrence rate ω estimated by the lattice noise estimating section 5.

Thereafter, the adjustment amount calculating section 9 calculates an adjustment amount Δα of the basic sharpening strength α in accordance with the following Expression ③(S12).

$$\Delta\alpha = \alpha\omega \qquad \text{Expression ③}$$

Thereafter, the sharpening strength determining section 10 calculates basic sharpening strength α', having been adjusted, from the basic sharpening strength α and the adjustment amount Δα, in accordance with the following Expression ④(S13).

$$a' = a + \Delta a$$
$$= (1 + \omega)a \qquad \text{Expression ④}$$

The basic sharpening strength α' having been adjusted is calculated by performing the foregoing steps S1 to S13. The basic sharpening strength α' having been adjusted is used to perform the sharpening process in the sharpening process section 11 described later.

Note that, as apparent from the Expression ④, the setting is such that: as the lattice noise occurrence rate ω is higher, the basic sharpening strength α' having been adjusted is higher. That is, when the lattice noise occurrence rate ω is higher, the pre-blurring strength S is set to be higher in accordance with the Expression ②, so that an image having been subjected to the pre-blurring process is more blurred. Even when the image is blurred by the pre-blurring process in this manner, the sharpening process is performed with the higher basic sharpening strength α', so that it is possible to restore the sharpness of the input image.

(5) Sharpening process performed by the sharpening process section 11.

Examples of a concrete method for performing the sharpening process include (a) an emphasis based on primary differential operation, and (b) an emphasis based on secondary differential operation (Laplacian). That is, any sharpening process may be employed as long as the sharpening process causes the image blurred by the pre-blurring process to be restored, or makes edges of the image clearer. The following description exemplifies the emphasis based on Laplacian that is widely used since this enables the emphasizing process with comparative ease.

A typical Laplacian process is such that: Laplacian of each pixel of image data of an original image is subtracted from each pixel value of the image data, so that the edges are emphasized. Supposing that each pixel value of the image data of the original image, that is, an original signal is f(i,j) (i,j indicates a coordinate), and supposing that each pixel having been subjected to the process based on Laplacian, that is, a process signal is F(i, j), the following process is expressed by the following Expression ⑤.

$$F(i,j) = f(i,j) - \alpha \cdot \nabla^2 f(i,j) \qquad \text{Expression ⑤}$$

In the sharpening strength processing section 11 of the present embodiment, the basic sharpening strength α', having been adjusted, that was calculated in S13 as the sharpening strength, is used. Thus, a signal F'(i,j) having been subjected to the sharpening process by the sharpening process section 11 is expressed by the following Expression ⑥.

$$F(i, j) = f(i, j) - a' \cdot \nabla^2 f(i, j)$$
$$= f(i, j) - a(1 + \omega) \cdot \nabla^2 f(i, j) \qquad \text{Expression ⑥}$$

Note that, as apparent from the Expression ⑤, the setting is such that: as the lattice noise occurrence rate ω is higher, the basic sharpening strength α' having been adjusted is higher. That is, when the lattice noise occurrence rate ω is higher, the pre-blurring strength S is set to be higher in accordance with the Expression ②, so that an image having been subjected to the pre-blurring process is more blurred. Even when the image is blurred by the pre-blurring process in this manner, the sharpening process is performed with the higher basic sharpening strength α', so that it is possible to restore the sharpness of the input image.

Note that, the image processing device 2 described above may be realized by an image processing program which is carried out as an image processing method by a computer. The program may be stored in a computer-readable storage medium (not shown) such as a CDROM. Further, it is also possible to arrange the image processing device by using a digital circuit such as a microprocessor which enables the image processing program to operate, and a DSP (Digital Signal Processor).

Further, in the description of the present embodiment, the input image to the image processing device 2 is an analog image recorded on the negative film. However, the image processing device of the present invention is not necessarily limited to the case where the input image is the analog image, but the image processing device of the present invention can be applied to the case where the input image is a digital image.

Further, in the description of the present embodiment, the scaling-up/down process section 7 is provided in a preceding stage of the sharpening process section 11. However, the image processing device of the present invention is not necessarily limited to the foregoing arrangement, but the scaling-up/down process section 7 may be provided in the following stage of the sharpening process section 11. In this case, another sharpening process section is provided in the following stage of the scaling-up/down process section 7. Thus, it is possible to restore the blurred image brought about by the scaling-up/down process.

Note that, the image processing device of the present invention may be arranged so that a blurring process based on the pre-blurring process is performed before the scaling-up/down process. Likewise, the image processing method of the present invention may be arranged so that the blurring process based on the pre-blurring process is performed before the scaling-up/down process.

According to the image processing device and the image processing method, the blurring process is performed before the scaling-up/down process. Thus, it is possible to reduce noises contained in the input image before the noise strength unevenness is brought about by the scaling-up/down process. Thus, in the output image that has been subjected to the scaling-up/down process, it is possible to reduce the difference between a portion having many noises and a portion having less noises. Therefore, it is possible to output a high-quality image in which the lattice noise is further reduced.

Further, the image processing device of the present invention may be arranged so that the lattice noise occurrence rate estimating means estimates the lattice noise occurrence rate in accordance with an expansion rate at which the input image is scaled up so as to be the output image. Likewise, the image processing method of the present invention may be arranged so that the lattice noise occurrence rate estimating means estimates the lattice noise occurrence rate in accordance with an expansion rate at which the input image is scaled up so as to be the output image.

That is, the occurrence of the lattice noise tends to be influenced by the expansion rate in performing the scaling-up/down process. That is, when the expansion rate varies, the noise strength unevenness varies in the scaled-up (down) image, so that also the lattice noise occurrence rate varies.

In the image processing device of the present invention, the lattice noise estimating means estimates the lattice noise occurrence rate in accordance with the expansion rate, so that it is possible to estimate the lattice noise occurrence rate more exactly. Further, also in the image processing method of the present invention, the lattice noise occurrence rate is estimated in accordance with the expansion rate, so that it is possible to estimate the lattice noise occurrence rate more exactly. Therefore, it is possible to output a high-quality image in which the lattice noise is reduced more.

Further, the image processing device of the present invention may be arranged so that the lattice noise occurrence rate is estimated by using an estimation table such that: as the expansion rate comes closer to a vicinity of 1, the lattice noise occurrence rate becomes higher. Further, the lattice noise occurrence rate is estimated by using an estimation table such that: as the expansion rate comes closer to a vicinity of 1, the lattice noise occurrence rate becomes higher That is, in a case where the expansion rate is in a vicinity of 1, the noise strength unevenness is large, so that the lattice noise tends to occur.

In the image processing device and the image processing method of the present invention, the lattice noise occurrence rate is estimated by using the estimation table such that: as the expansion rate comes closer to a vicinity of 1, the lattice noise occurrence rate becomes higher. Thus, it is possible to estimate the lattice noise occurrence rate more exactly. Further, if the estimation table is set in the lattice noise occurrence rate estimating means in advance, it is possible to simplify a process for estimating the lattice noise occurrence rate. Therefore, it is possible to output a high-quality image, in which the lattice noise is further reduced, by performing a simple process.

Further, the image processing device of the present invention may be arranged so that the lattice noise occurrence rate estimating means estimates the lattice noise occurrence rate in accordance with density of the input image. Likewise, the image processing method of the present invention may be arranged so that that the lattice noise occurrence rate estimating means estimates the lattice noise occurrence rate in accordance with density of the input image.

That is, the lattice noise occurrence rate varies depending on an extent to which the input image is exposed. In a case where the input image is an analog image on a negative film for example, when the input image is in a state of underexposure, a process for strengthening contrast causes the lattice noise to be conspicuous. While, the input image is in a state of overexposure, an output of the CCD functioning as an imaging device is reduced, so that the lattice noise is conspicuous in the image information.

Then, in the image processing device of the present invention, particularly, the lattice noise occurrence estimating means estimates the lattice noise occurrence rate in accordance with the density of the input image. Further, in the image processing method of the present invention, particularly, the lattice noise occurrence rate is estimated in accordance with the density of the input image.

That is, it is possible to judge a condition, under which the input image is exposed, in accordance with the density of the input image. Thus, when the lattice noise occurrence rate is estimated in accordance with the density of the input image, this estimation is substantially the same as estimation performed in accordance with the condition under which the input image is exposed, so that it is possible to estimate the lattice noise occurrence rate exactly. Therefore, it is possible to output a high-quality image in which the lattice noise is further reduced.

Further, the image processing device of the present invention may be arranged so that the density of the input image is average density of the input image. Likewise, the image processing method of the present invention may be arranged so that the density of the input image is average density of the input image.

According to the arrangement, the lattice noise occurrence rate is estimated in accordance with the average density of the input image. The average density of the input image is a parameter which is most suitable for grasping a condition under which the input image is exposed, so that it is possible to estimate the lattice noise occurrence rate more exactly. Therefore, it is possible to output a high-quality image in which the lattice noise is further reduced.

Further, the image processing device of the present invention may be arranged so that the lattice noise occurrence rate is estimated by using an estimation table such that: as the density of the input image comes closer to a maximum value or a minimum value, the lattice noise occurrence rate becomes higher. Likewise, the image processing method of the present invention may be arranged so that the lattice noise occurrence rate is estimated by using an estimation table such that: as the density of the input image comes closer to a maximum value or a minimum value, the lattice noise occurrence rate becomes higher.

In a case where the input image is an analog image on a negative film for example, as an extent to which the input image is in a state of underexposure is larger, that is, as the density is lower, it is necessary to make the contrast stronger, so that the lattice noise occurrence rate becomes higher. While, as an extent to which the input image is in a state of overexposure is larger, that is, as the density is higher, an output of the CCD is less, so that the lattice noise occurrence rate becomes higher.

Then, in the image processing device and the image processing method of the present invention, particularly, the lattice noise occurrence rate is estimated by using an estimation table such that: as the density of the input image comes closer to a maximum value or a minimum value, the lattice noise occurrence rate becomes higher. Thus, it is possible to estimate the lattice noise occurrence rate more exactly. Further, when the estimation table is set in the lattice noise occurrence rate estimating means in advance, it is possible to simplify a process for estimating the lattice noise occurrence rate.

Therefore, it is possible to output a high-quality image, in which the lattice noise is reduced more, by performing a simple process.

Further, the image processing device of the present invention may include sharpening process means for performing sharpening process with strength adjusted in accordance with the lattice noise occurrence rate that has been estimated by the lattice noise occurrence rate estimating means.

That is, in a case where the lattice noise occurrence rate is estimated to be high, the strength of the blurring process performed by the pre-blurring process section is set to be high, so that the input image is further blurred.

Then, the image processing device of the present invention further includes sharpening process means for performing sharpening process with strength adjusted in accordance with the lattice noise occurrence rate that has been estimated by the lattice noise occurrence rate estimating means. Further, in the image processing method of the present invention, particularly, a sharpening process is performed with strength adjusted in accordance with the lattice noise occurrence rate that has been estimated.

That is, in a case where the lattice noise occurrence rate is high, it is possible to set the sharpening process means to perform the sharpening process with higher strength compared with a case where the lattice noise occurrence rate is low. Thus, even if the pre-blurring process means performs the pre-blurring process with high strength which blurs the input image as described above, it is possible to restore the sharpness of the input image by causing the sharpening process means to perform the sharpening process. Therefore, it is possible to output an image in which the lattice noise is reduced and the sharpness is preferable.

Further, a program of the present invention is a program causing a computer to carry out any one of the foregoing image processing methods.

The foregoing program causes a computer to carry out the image processing method of the present invention, so that it is possible to output a high-quality digital image in which the lattice noise is reduced.

Further, a storage medium of the present invention is a computer-readable storage medium storing the program arranged in the foregoing manner.

According to the storage medium, it is easy to provide the program carrying out the image processing method by which it is possible to obtain a high-quality output image in which the lattice noise is reduced.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing device, which performs a scaling-up/down process with respect to an input image so as to output a digital image, comprising:
   lattice noise occurrence rate estimating means for estimating a lattice noise occurrence rate in an output image; and
   pre-blurring processing means for performing a pre-blurring process with strength that has been determined in accordance with the lattice noise occurrence rate estimated by the lattice noise occurrence rate estimating means.

2. The image processing device as set forth in claim 1, wherein a blurring process performed by the pre-blurring processing means is performed before the scaling-up/down process.

3. The image processing device as set forth in claim 1, wherein the lattice noise occurrence rate estimating means estimates the lattice noise occurrence rate in accordance with an expansion ratio at which the input image is scaled up so as to be the output image.

4. The image processing device as set forth in claim 3, wherein the lattice noise occurrence rate is estimated by using an estimation table such that: when the expansion ratio is within a pre-determined range including 1, the estimated lattice noise occurrence rate increases as the expansion ratio approaches 1, wherein an expansion ratio of 1 corresponds to the input image and the output image having the same size.

5. The image processing device as set forth in claim 1, wherein the lattice noise occurrence rate estimating means estimates the lattice noise occurrence rate in accordance with density of the input image.

6. The image processing device as set forth in claim 5, wherein the density of the input image is average density of the input image.

7. The image processing device as set forth in claim 5, wherein the lattice noise occurrence rate is estimated by using an estimation table such that: as the density of the input image comes closer to a maximum value or a minimum value, the lattice noise occurrence rate becomes higher.

8. The image processing device as set forth in claim 1, further comprising sharpening process means for performing sharpening process with strength adjusted in accordance with the lattice noise occurrence rate that has been estimated by the lattice noise occurrence rate estimating means.

9. An image processing method for performing a scaling-up/down process with respect to an input image so as to output a digital image, comprising the steps of:
   estimating a lattice noise occurrence rate in an output image; and
   performing a bluffing process with strength that has been determined in accordance with the lattice noise occurrence rate.

10. The method as set forth in claim 9, wherein the blurring process is performed before the scaling-up/down process.

11. The method as set forth in claim 9, wherein the lattice noise occurrence rate is estimated in accordance with an expansion ratio at which the input image is scaled up so as to be the output image.

12. The method as set forth in claim 11, wherein the lattice noise occurrence rate is estimated by using an estimation table such that: when the expansion ratio is within a pre-determined range including 1, the estimated lattice noise occurrence rate increases as the expansion ratio approaches 1, wherein an expansion ratio 1 of corresponds to the input image and the output image having the same size.

13. The method as set forth in claim 9, wherein the lattice noise occurrence rate is estimated in accordance with density of the input image.

14. The method as set forth in claim 13, the density of the input image is average density of the input image.

15. The method as set forth in claim 13, wherein the lattice noise occurrence rate is estimated by using an estimation table such that: as the density of the input image comes closer to a maximum value or a minimum value, the lattice noise occurrence rate becomes higher.

16. The method as set forth in claim 9, wherein a sharpening process is performed with strength adjusted in accordance with the lattice noise occurrence rate that has been estimated.

17. A computer-readable storage medium, which stores a program causing a computer to carry out an image processing method for performing a scaling-up/down process with respect to an input image so as to output a digital image, wherein
the program causes the computer to carry out the steps of: estimating a lattice noise occurrence rate in an output image; and performing a blurring process with strength that has been determined in accordance with the lattice noise occurrence rate.

18. The image processing device as set forth in claim 1, further comprising sharpening process means for performing a sharpening process after the scaling-up/down process is performed.
wherein the pre-blurring processing means performs the pre-blurring process before the scaling-up/down process is performed.

19. The method as set forth in claim 9, the method further comprising performing a sharpening process after the scaling-up/down process is performed,
wherein the blurring process is performed before the scaling-up/down process is performed.

* * * * *